United States Patent
Gong et al.

(10) Patent No.: US 8,600,428 B2
(45) Date of Patent: Dec. 3, 2013

(54) METHOD, APPARATUS, AND SYSTEM FOR INITIALIZING COGNITIVE SYSTEM SUPPORTED BY COGNITIVE PILOT CHANNEL

(75) Inventors: Lei Gong, Chengdu (CN); Guang Liu, Basingstoke (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/495,661

(22) Filed: Jun. 13, 2012

(65) Prior Publication Data

US 2012/0270588 A1    Oct. 25, 2012

Related U.S. Application Data

(63) Continuation of application No. PCT/CN2011/071189, filed on Feb. 23, 2011.

(30) Foreign Application Priority Data

Apr. 16, 2010 (CN) .......................... 2010 1 0150099

(51) Int. Cl.
*H04W 4/00* (2009.01)
*H04B 7/00* (2006.01)
*H01L 41/00* (2006.01)
*H02N 2/00* (2006.01)

(52) U.S. Cl.
USPC ............... 455/524; 455/432.1; 455/422.1; 455/434; 310/328

(58) Field of Classification Search
USPC ............. 455/432.1, 422.1, 434, 524; 310/328
See application file for complete search history.

(56) References Cited

U.S. PATENT DOCUMENTS

| 8,090,807 | B2 * | 1/2012 | Chung et al. | 709/222 |
| 8,238,980 | B1 * | 8/2012 | Shusterman | 455/574 |
| 8,254,981 | B2 * | 8/2012 | Dwyer et al. | 455/525 |
| 8,259,652 | B2 * | 9/2012 | Huang et al. | 370/328 |
| 8,259,667 | B2 * | 9/2012 | Jung et al. | 370/330 |

(Continued)

FOREIGN PATENT DOCUMENTS

| CN | 1996784 A | 7/2007 |
| CN | 101257714 A | 9/2008 |

(Continued)

OTHER PUBLICATIONS

Search report issued in corresponding European patent application No. 11768379.7, dated Aug. 28, 2012, total 12 pages.

(Continued)

*Primary Examiner* — Bobbak Safaipour

(57) ABSTRACT

The present invention discloses a method, an apparatus, and a system for initializing a cognitive system supported by a cognitive pilot channel, where implementation of the method includes: sending a frequency initialization request message to a CPC AP; receiving a frequency initialization response message sent by the CPC AP, where the frequency initialization response message includes CPC private resource description information; broadcasting cognitive information of a base station and description information of an uplink access channel to a terminal over a channel specified in the CPC private resource description information; receiving cognitive information of the terminal over CPC private resources, deciding a work frequency according to the cognitive information of the terminal, and sending the decided work frequency to the terminal; establishing, on the decided work frequency, a link with the terminal.

16 Claims, 16 Drawing Sheets

(56) References Cited

U.S. PATENT DOCUMENTS

| | | |
|---|---|---|
| 2007/0275717 A1 | 11/2007 | Edge et al. |
| 2008/0132291 A1* | 6/2008 | Barr et al. ............... 455/567 |
| 2009/0239530 A1* | 9/2009 | Luo et al. ............... 455/432.1 |
| 2010/0103873 A1 | 4/2010 | Buracchini |

FOREIGN PATENT DOCUMENTS

| | | |
|---|---|---|
| CN | 101395940 A | 3/2009 |
| CN | 101478352 A | 7/2009 |
| WO | 2008119380 A1 | 10/2008 |
| WO | 2008119381 A1 | 10/2008 |

OTHER PUBLICATIONS

ETSI TR 102 683 V1 .1 .1: "Reconfigurable Radio Systems (RRS); Cognitive Pilot Channel (CPC)," Sep. 2009, total 38 pages.

Draft ETSI TR 102 802 V0.1 .2: "Reconfigurable Radio Systems (RRS); Cognitive Radio System Concept," Dec. 2009, total 30 pages.

International search report for International application No. PCT/CN2011/071189, dated Jun. 2, 2011, total 3 pages.

Written Opinion of the International Search Authority for International application No. PCT/CN2011/071189, and the English translation thereof, total 4 pages, Aug. 27, 2012.

Mueck et al. "Smart Femto-Cell Controller Based Distributed Cognitive Pilot Channel", proceedings of the 4th international conference on crowncom 2009, 978-1-4244-3424-4/09, 2009 IEEE, total 5 pages.

First office action issued in corresponding Chinese patent application 201010150099.5, dated Mar. 25, 2013, and English translation thereof, total 9 pages.

* cited by examiner

METHOD, APPARATUS, AND SYSTEM FOR INITIALIZING COGNITIVE SYSTEM SUPPORTED BY COGNITIVE PILOT CHANNEL

CROSS-REFERENCE TO RELATED APPLICATIONS

This application is a continuation of International Application No. PCT/CN2011/071189, filed on Feb. 23, 2011, which claims priority to Chinese Patent Application No. 201010150099.5, filed on Apr. 16, 2010, both of which are hereby incorporated by reference in their entireties.

FIELD OF THE INVENTION

The present invention relates to a communications technology field, and in particular, to a method, an apparatus, and a system for initializing a cognitive system supported by a cognitive pilot channel.

BACKGROUND OF THE INVENTION

An existing policy for using spectrums is fixed allocation. That is, the government allocates fixed resources for a specific service of a specific user, for example, TV, radio, radar, and navigation all use fixed frequencies. Some frequencies are not used constantly and are not used in all geographic locations. Therefore, in some periods and at some geographic locations, a situation in which some frequencies fail to be fully used exists, which causes a great waste of spectrum resources. A cognitive radio (CR, Cognitive Radio) technology may detect, by cognizing a radio spectrum environment, these unoccupied frequency bands that appear anytime and anywhere, and dynamically access these unoccupied frequency bands under a premise that a primary user (Primary User, user using a fixedly allocated frequency) is not interfered. In this way, spectrum utilization is improved. Based on the current shortage situation of spectrum resources and that the CR technology has performance of improving the spectrum utilization, standard associations worldwide make great efforts to standardize the CR technology.

Two problems need to be solved for using the CR technology: 1. Accurately detect a spectrum blanking period in time; 2. Access these spectrums in the blanking period in time. In addition, a reconfigurable radio system (Reconfigurable Radio Systems, RRS) describes that various radio technologies and services exist in a future radio communication environment. A terminal may select an access technology and a carrier according to a service requirement. Work frequencies of different access technologies change anytime and anywhere. In such a complex network environment, time and power are wasted for the terminal to search for a specific access technology. Therefore, the RSS criterion group proposes a cognitive pilot channel (Cognitive Pilot Channel, PPC). This channel may be borne on an existing radio access network such as a Global System for Mobile Communications (Global System for Mobile Communications, GSM) network and may also be borne on a future radio access network. Regardless of an access network on which the channel is borne, a CPC access point (CPC Access Point, CPC AP) supports wide-scope coverage, and not only covers a large number of cells with different standards and of different carriers, but also covers cognitive cells of different types. The CPC AP periodically broadcasts spectrum utilization states and service provisioning states of different areas. Upon powering on, a terminal may quickly obtain a local available spectrum and a local offerable service from the CPC AP.

As can be seen from the foregoing, a cognitive network under CPC network architecture is a network established between a terminal with a cognition function and a base station. The terminal and the base station need to cognize the radio spectrum environment. Before establishing the cognitive network, the terminal and the base station need to exchange cognitive information, negotiate a work frequency and a broadcast channel. A function of the CPC AP is to assist the base station and the terminal in completing cognitive information exchanging, work frequency negotiation, broadcast channel selection, and so on, and finally establishing a cognitive system.

A process that is proposed for initializing the cognitive system is as follows:

A terminal and a base station are powered on, scan a CPC, and obtain a set of available spectrums from a CPC AP, that is, a set of frequencies that are not registered with the CPC AP for use.

The terminal and the base station cognize the set of available frequencies and complete assessment on each frequency; then, the base station sends a random access request to the CPC AP, obtains sending resources of a next message, and establishes a bearer with the CPC AP.

After the base station establishes the bearer with the CPC AP, the base station sends a cognitive message to the CPC AP, including a cognition result, a base station identify (Identity, ID), and geographic location information. The base station is required to support a positioning technology, for example, a Global Position System (Global Position System, GPS).

After receiving the message of the base station, the CPC AP broadcasts the received cognition result on a CPC broadcast channel.

The terminal obtains information about all base stations around the terminal according to the broadcast information, and judges, according to the geographic location information, whether the base station is within its communication scope and satisfies its service requirement. After assessment, if the terminal expects to establish a network with a particular base station, the terminal first sends a random access request to the CPC AP, obtains sending resources of the next message, and establishes a bearer with the CPC AP.

After establishing the bearer with the CPC AP, the terminal sends messages such as a spectrum cognition result and a target base station ID to the CPC AP. As the terminal does not establish a work frequency with the base station, the terminal notifies, only through the CPC AP, the base station that the terminal expects to establish a network with the base station.

The CPC AP sends the cognition result of the terminal to a target base station according to the target base station ID.

After receiving the cognition result of the terminal, the base station first converges cognitive data to obtain a cognitive decision, where the cognitive decision includes a work frequency and a broadcast channel used by the base station on the network, and sends the cognitive decision result to the CPC AP.

The CPC AP sends the cognitive decision to the terminal.

If the terminal does not satisfy with the decision result, the terminal continues to send a cognitive message to the CPC AP, including the cognition result, the base station ID, an expected work frequency, and so on. The CPC AP sends the message of the terminal to the base station so that the base station adjusts the cognitive decision.

If the terminal satisfies with the decision result, the terminal sends a confirmation message to the base station and the CPC AP. The CPC AP releases the bearer with the base station and releases the bearer with the terminal.

The terminal and the base station are switched over to the work frequency specified in the decision result and establish a channel.

During the implementation of the present invention, the inventor discovers that:

As the base station ID is introduced, the ID may be a unique ID on the whole network and a value of the ID may be very large, system implementation complexity increases. After the terminal knows the base station ID, as the terminal and the base station do not know a communication capability and scope of each other, both the base station and terminal need to support the positioning technology. After the positioning technology such as the GPS is introduced, system costs may increase because the GPS is expensive.

SUMMARY OF THE INVENTION

Embodiments of the present invention provide a method, an apparatus, and a system for initializing a cognitive system supported by a cognitive pilot channel to reduce system implementation complexity and costs.

To resolve the preceding technical issues, an embodiment of the method for initializing a cognitive system supported by the cognitive pilot channel according to the present invention may be implemented by using the following technical solution:

sending a frequency initialization request message to a cognitive pilot channel access point CPC AP;
receiving a frequency initialization response message sent by the CPC AP, where the frequency initialization response message includes CPC private resource description information;
broadcasting cognitive information of a base station and description information of an uplink access channel to a terminal over a channel specified in the CPC private resource description information;
receiving cognitive information of the terminal over CPC private resources, deciding a work frequency according to the cognitive information of the terminal, and sending the decided work frequency to the terminal, where the cognitive information of the terminal is sent, when an intersection between the cognitive information of the terminal and that of the base station is not null, by the terminal over a channel specified in the description information of the uplink access channel; and
establishing, on the decided work frequency, a link with the terminal.

A method for initializing a cognitive system supported by a cognitive pilot channel includes:
receiving a frequency initialization response message broadcast by a CPC AP, where the frequency initialization response message includes CPC private resource description information;
receiving cognitive information of a base station and description information of an uplink access channel over a channel specified in the CPC private resource description information;
when an intersection between cognitive information of a terminal and that of the base station is not null, sending the cognitive information of the terminal to the base station over a channel specified in the description information of the uplink access channel, where the cognitive information of the terminal is used to enable the base station to decide a work frequency; and
receiving a work frequency sent by the base station and establishing, on the decided work frequency, a link with the base station.

A base station includes:
an initialization request sending unit, configured to send a frequency initialization request message to a CPC AP;
an initialization response receiving unit, configured to receive a frequency initialization response message sent by the CPC AP, where the frequency initialization response message includes CPC private resource description information;
a broadcast unit, configured to broadcast cognitive information of the base station and description information of an uplink access channel to a terminal over a channel specified in the CPC private resource description information;
a cognitive information receiving unit, configured to receive cognitive information of the terminal over CPC private resources, where the cognitive information is sent, when an intersection between the cognitive information of the terminal and that of the base station is not null, by the terminal over a channel specified in the description information of the uplink access channel;
a work frequency decision unit, configured to decide a work frequency according to the cognitive information of the terminal;
a work frequency sending unit, configured to send the decided work frequency to the terminal; and
a link establishment unit, configured to establish, on the decided work frequency, a link with the terminal.

A terminal includes:
an initialization response receiving unit, configured to receive a frequency initialization response message broadcast by the CPC AP, where the frequency initialization response message includes CPC private resource description information;
an information receiving unit, configured to receive cognitive information of a base station and description information of an uplink access channel over a channel specified in the CPC private resource description information;
a cognitive information sending unit, configured to send, when an intersection between the cognitive information of the terminal and that of the base station is not null. cognitive information of the terminal to the base station over a channel specified in the description information of the uplink access channel, where the cognitive information of the terminal is used to enable the base station to decide a work frequency;
a work frequency receiving unit, configured to receive a work frequency sent by the base station; and
a link establishment unit, configured to establish, on the decided work frequency, a link with the base station.

A cognitive system supported by a cognitive pilot channel includes:
a base station, configured to send a frequency initialization request message to a CPC AP; receive a frequency initialization response message sent by the CPC AP, where the frequency initialization response message includes CPC private resource description information; broadcast cognitive information of the base station and description information of an uplink access channel to a terminal over a channel specified in the CPC private resource description information; receive cognitive information of the terminal over CPC private resources, decide a work frequency according to the cognitive information of the terminal, and send the decided work frequency to the terminal; and establish, on the decided work frequency, a link with the terminal; and the terminal, configured to receive the frequency initialization response message broadcast by the CPC AP, where the frequency initialization response message includes the CPC private resource description information; receive the cognitive information of the base station and the description information of the uplink access channel over the channel specified in the CPC private resource description information; send the cognitive information of the terminal to the base station over a channel specified in the description information of the uplink access channel, where an intersection between the cognitive information of the terminal and that of the base station is not null; receive the work frequency sent by the base station and establish, on the work frequency, a link with the base station.

The preceding technical solutions have the following beneficial effects: With the preceding technical solutions, a base station does not need to broadcast an ID to a terminal, which avoids use of an ID with a large value and reduces system implementation complexity; as a CPC AP allocate CPC private resources for an area where the base station is located, the base station does not need to perform positioning and the terminal does not need to judge a geographic location of the base station. Therefore, a positioning technology does not need to be introduced, which reduces system costs.

BRIEF DESCRIPTION OF THE DRAWINGS

To clearly describe technical solutions in the embodiments of the present invention or in the prior art, the following briefly describes the accompanying drawings required in descriptions of the embodiments or the prior art. Obviously, the accompanying drawings described below illustrate only some embodiments of the present invention and those skilled in the art may further derive other accompanying drawings based on these accompanying drawings without creative efforts.

DETAILED DESCRIPTION OF THE EMBODIMENTS

The technical solutions in the embodiments of the present invention are described clearly and completely below with reference to the accompanying drawings in the embodiments of the present invention. Evidently, the embodiments described below are only a part of embodiments of the present invention rather than all of the embodiments. All other embodiments that those skilled in the art derive from the embodiments in the present invention without any creative effort should fall within the protection scope of the present invention.

Figure 1:
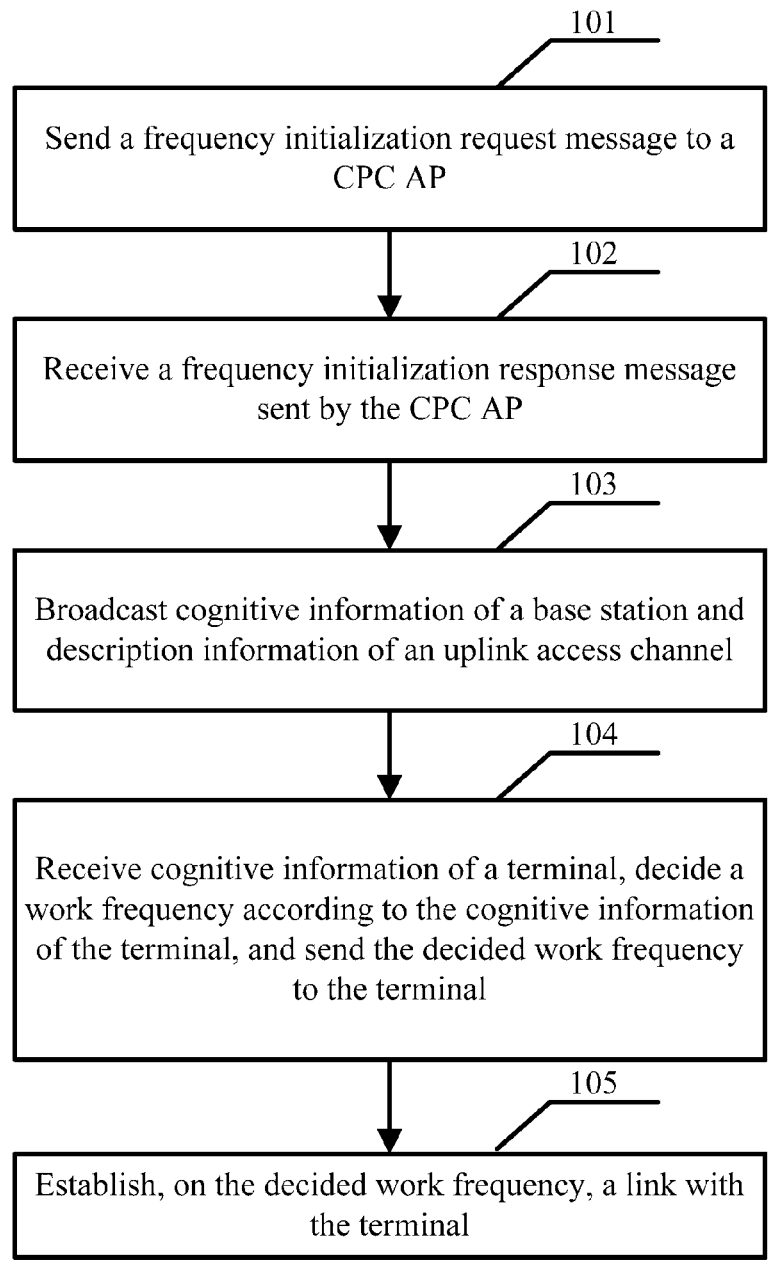
FIG. 1 is a flowchart of a method according to a first embodiment of the present invention.

A first embodiment is shown in FIG. 1. This embodiment of the present invention provides a method for initializing a cognitive system supported by a cognitive pilot channel, including:

101: Send a frequency initialization request message to a cognitive pilot channel access point CPC AP.

102: Receive a frequency initialization response message sent by the CPC AP, where the frequency initialization response message includes CPC private resource description information.

103: Broadcast cognitive information of a base station and description information of an uplink access channel to a terminal over a channel specified in the CPC private resource description information.

104: Receive cognitive information of the terminal over CPC private resources, decide a work frequency according to the cognitive information of the terminal, and send the decided work frequency to the terminal, where the cognitive information of the terminal is sent, when an intersection between the cognitive information of the terminal and that of the base station is not null, by the terminal over a channel specified in the description information of the uplink access channel.

In step 104, for each terminal, the uplink access channel that is used for the terminal to send the cognitive information of the terminal and is specified in the description information of the uplink access channel belongs to the channel specified in the CPC private resource description information. When the intersection between the cognitive information of the terminal and that of the base station is not null, the terminal sends the base station the cognitive information of the terminal over the channel specified in description information of the uplink access channel.

As multiple terminals may exist, each terminal sends terminal cognitive information over a channel (that is, an uplink access channel) specified in the description information of the uplink access channel for each terminal respectively. On the base station side, the base station receives the cognitive information sent by these terminals over the CPC private resources.

The cognitive information of the terminal includes information such as a set of available network-side spectrums cognized by the terminal and transmit power of a network-side device.

105: Establish, on the decided work frequency, a link with the terminal.

Further, after the work frequency decision in step 104 is completed, the terminal may not satisfy with the current decision result. In this case, the work frequency needs to be further negotiated.

Further, after the work frequency decision in step 104 is completed, resources of the channel specified in the CPC private resource description information are released. In the preceding technical solution, the resources are released timely, which improves resource utilization.

Further, before receiving the cognitive information of the terminal in step 104, a random access request of the terminal is received. If the amount of resources requested in the random access request of the terminal exceeds the amount of the CPC private resources specified in the CPC private resource description information, a resource request message is sent to the CPC AP and received resource information that is returned by the CPC AP is sent to the terminal. The preceding technical solution provides a handling manner in a situation in which CPC private resources allocated by the CPC AP are insufficient, which improves flexibility of resource allocation. In this way, the solution in this embodiment is more applicable to an actual requirement.

Further, a negotiation request sent by the terminal is received, where the negotiation request carries a work frequency expected by the terminal; a new work frequency is decided according to the work frequency expected by the terminal and the new work frequency is sent to the terminal; the establishing, on the decided work frequency, a link with the terminal includes: establishing, on the new work frequency, a link with the terminal.

The preceding technical solution provides a negotiation method when the work frequency decided by the base station does not meet a service requirement of the terminal. A scenario in which the decided work frequency does not meet the service requirement of the terminal may be as follows: According to measurement performed by the terminal on an environment, channel quality of the work frequency does not meet the service requirement, or throughput of the work frequency does not meet the service requirement, and definitely, another reason may also lead to a failure in meeting the service requirement, which is not limited In this embodiment of the present invention. A method for obtaining the work frequency expected by the terminal may be as follows: The terminal selects, according to the service requirement (such as throughput and delay), a work frequency that meets the service requirement from a set of available channels cognized by the terminal as the work frequency expected by the terminal. The base station may decide the new work frequency as follows: After receiving the negotiation request of the terminal, the base station selects a work frequency from an intersection between a set of available work frequencies and work frequencies expected by the terminal as the new work frequency. It should be noted that the work frequencies expected by the terminal may be a set and are not limited to only one work frequency.

An execution subject of the preceding implementation manner may be the base station. In this embodiment, that the base station broadcasts an ID to the terminal is avoided and thereby the use of an ID with a large value is avoided, which reduces system implementation complexity. As the CPC AP allocates CPC private resources for an area where the base station is located, the base station does not need to perform positioning and the terminal does not need to judge a geographic location of the base station. Therefore, a positioning technology does not need to be introduced, which reduces system implementation complexity and costs. In addition, as the terminal does not need to judge the geographic location of the base station, complexity of selecting a proper base station is reduced. At last, the terminal and the base station do not need to send a large number of messages over a CPC AP trunk, which saves CPC channel resources.

Figure 2:
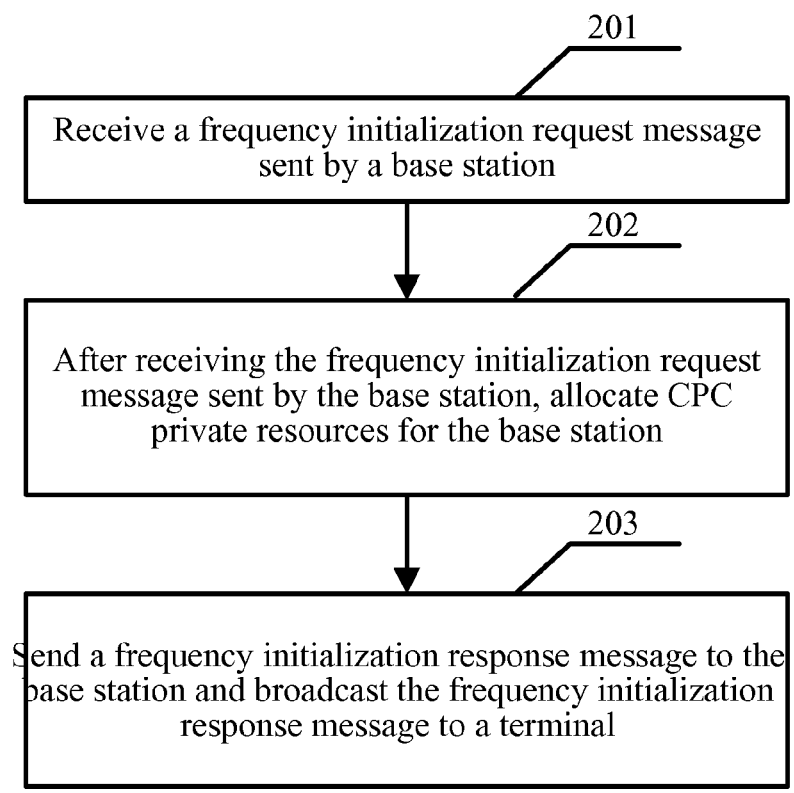
FIG. 2 is a flowchart of a method according to a second embodiment of the present invention.

A second embodiment is shown in FIG. 2. This embodiment of the present invention further provides another method for initializing a cognitive system supported by a cognitive pilot channel, including:

201: Receive a frequency initialization request message sent by a base station.

202: After receiving the frequency initialization request message sent by the base station, allocate CPC private resources for the base station;

203: Send a frequency initialization response message to the base station, where the frequency initialization response message includes CPC private resource description information, and broadcast the frequency initialization response message to a terminal.

Further, if a resource request message sent by the base station is received, re-allocate CPC resources according to the resource request message and then send information about allocated CPC resources to the base station and the terminal.

The preceding CPC private resources may also be periodically allocated to a cognitive system by a CPC AP in a situation in which the initialization request is not received. The allocated CPC private resources may also be allocated to another base station out of the coverage of the base station. In this way, CPC resources may be reused and thereby CPC resource utilization is improved.

An execution subject of the preceding embodiment may be the CPC AP. In this embodiment, private CPC resources are allocated for the base station and the terminal. The terminal directly communicates with the base station, that is, does not communicate with the base station through the CPC AP any longer, which saves channel resources between the base station and the CPC AP; in addition, the base station does not need to broadcast its ID, which avoids a trouble of using an ID with a large value; furthermore, the base station does not need to perform positioning, which reduces the popularization difficulty caused by introduction of a positioning technology; and at last, the terminal and the base station do not need to send a large number of messages over a CPC AP trunk, which saves CPC channel resources.

Figure 3:
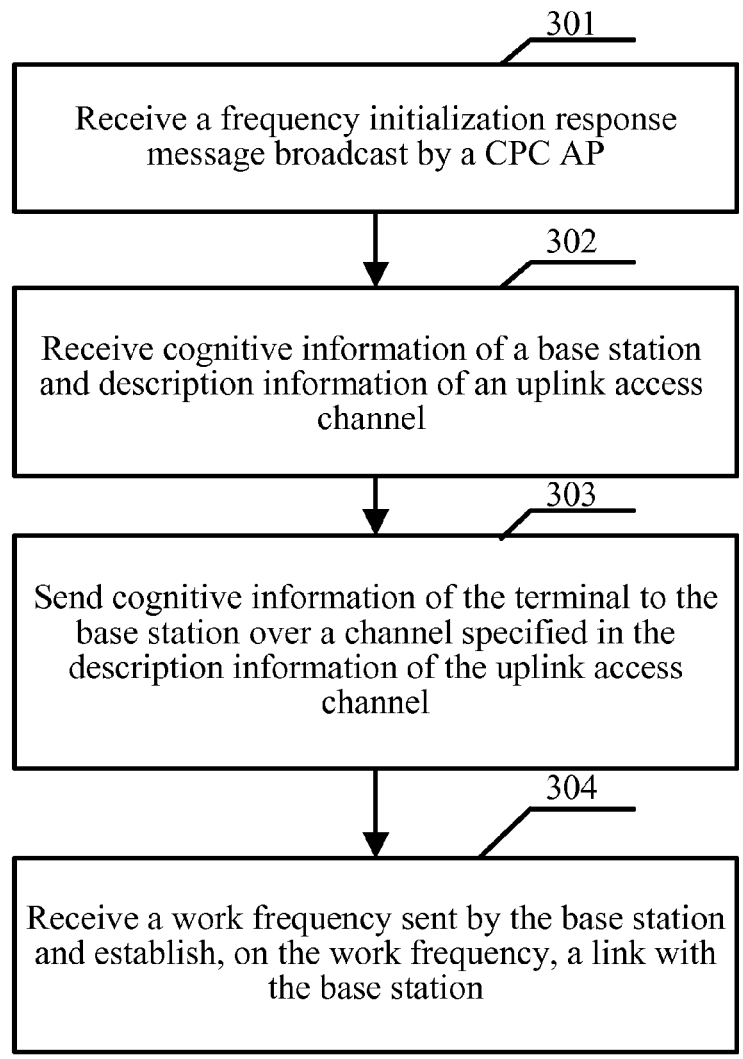
FIG. 3 is a flowchart of a method according to a third embodiment of the present invention.

A third embodiment is shown in FIG. 3. This embodiment of the present invention further provides another method for initializing a cognitive system supported by a cognitive pilot channel, including:

301: Receive a frequency initialization response message broadcast by a CPC AP, where the frequency initialization response message includes CPC private resource description information.

302: Receive cognitive information of a base station and description information of an uplink access channel over a channel specified in the CPC private resource description information.

303: When an intersection between the cognitive information of the base station and that of a terminal is not null, send the cognitive information of the terminal over a channel specified in the description information of the uplink access channel to the base station;

304: Receive a work frequency sent by the base station and establish, on the work frequency, a link with the base station.

Further, before sending the cognitive information of the terminal, step 303 further includes:

sending a random access request message to the base station and receiving resource information.

The sending the cognitive information of the terminal over the channel specified in the description information of the uplink access channel to the base station in step 303 includes:
sending the cognitive information of the terminal to the base station over a channel specified in the resource information.

The preceding further implementation manner provides a handling manner in a situation in which CPC private resources allocated by the CPC AP may be insufficient, which improves flexibility of resource allocation. In this way, the solution in this embodiment is more applicable to an actual requirement.

Further, before sending the cognitive information of the terminal, step 303 further includes:
judging, according to signal strength of the base station, whether the base station meets a service requirement of the terminal, and if the base station meets the service requirement of the terminal, sending the cognitive information of the terminal. The preceding implementation manner provides a specific example of base station selection by a terminal. It should be understood that another method may also be adopted to select a base station, which is not restricted in this embodiment of the present invention.

Further, in step 304, the following may also be included: Detect whether the work frequency meets the service requirement of the terminal. If the work frequency does not meet the service requirement of the terminal, send a negotiation request to the base station, where the negotiation request carries a work frequency expected by the terminal; and receive a new work frequency sent by the base station. In this case, the establishing, on the work frequency, a link with the base station includes: establishing, on the new work frequency, a link with the base station.

An execution subject of the preceding embodiments may be the terminal. In this embodiment, the terminal obtains CPC private resources allocated by the CPC AP for the terminal and the terminal directly communicates with the base station, that is, does not communicate with the base station through the CPC AP any longer, which saves channel resources between the base station and the CPC AP; in addition, the base station does not need to perform positioning, which reduces the popularization difficulty caused by introduction of a positioning technology.

Figure 4:
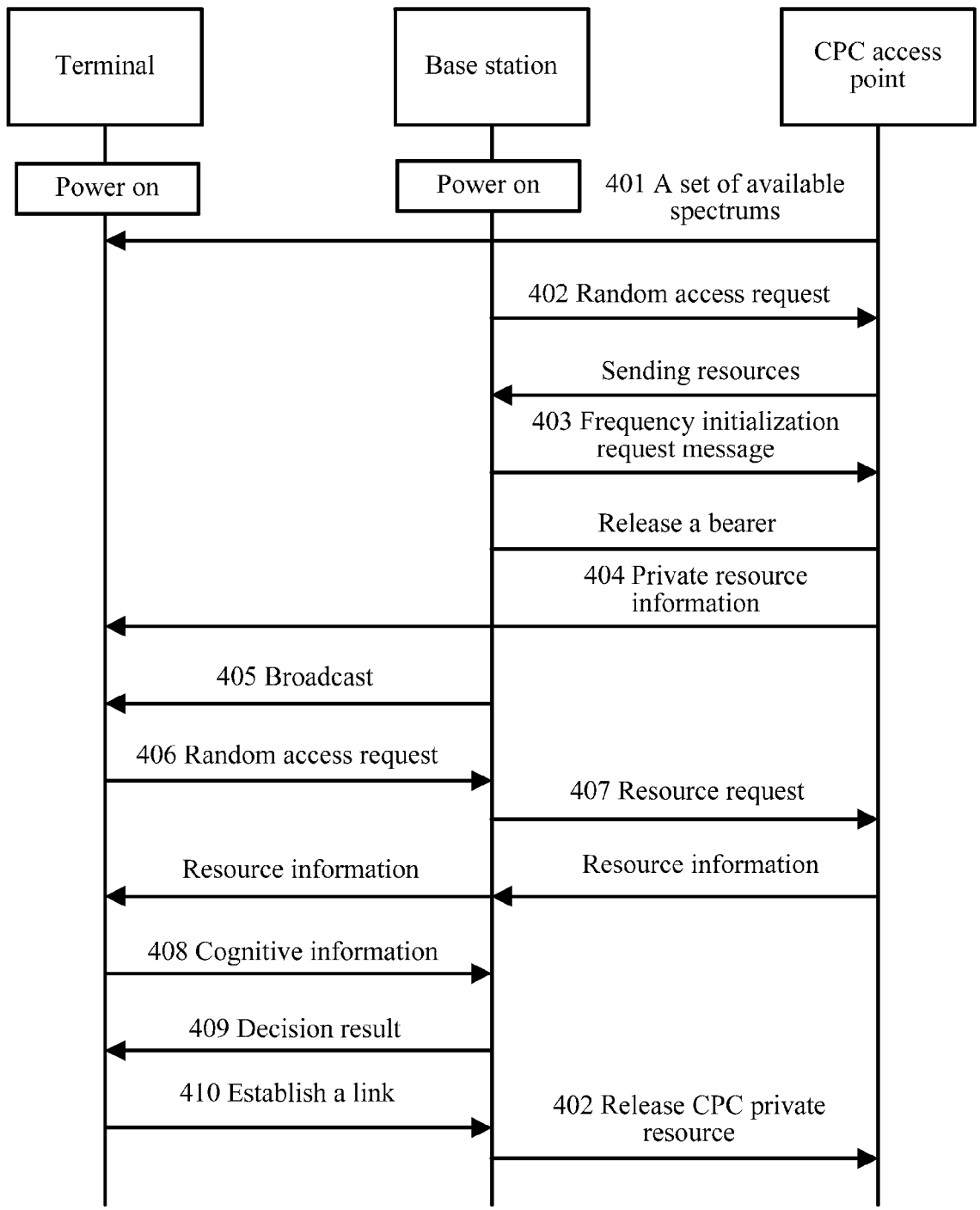
FIG. 4 is a flowchart of a method according to a fourth embodiment of the present invention.

A fourth embodiment provides a specific instance to describe an entire networking process of a CPC system. As shown in FIG. 4, the specific process includes:

401: A terminal and a base station are powered on and scan a CPC channel to obtain a set of available spectrums, where the set of available spectrums is a set of frequencies that are not registered with the CPC for use and the terminal and the base station may select proper frequencies from the set of available spectrums for work.

402: The terminal and the base station perform spectrum cognition, that is, perform cognition in the set of available frequencies given by the CPC, complete assessment on each frequency. Then, the base station sends a random access request to a CPC AP, obtains sending resources of a next message, and establishes a bearer with the CPC AP.

403: After establishing the bearer with the CPC AP, the base station sends a frequency initialization request message to the CPC AP.

404: After receiving the frequency initialization request message, the CPC AP allocates private resources from CPC resources to establish a cognitive system, where the private resources may be used to establish another cognitive system with small-area coverage; and sends description information of the allocated private resources to the base station and the terminal, where the sending manner may be broadcasting.

Figure 5:
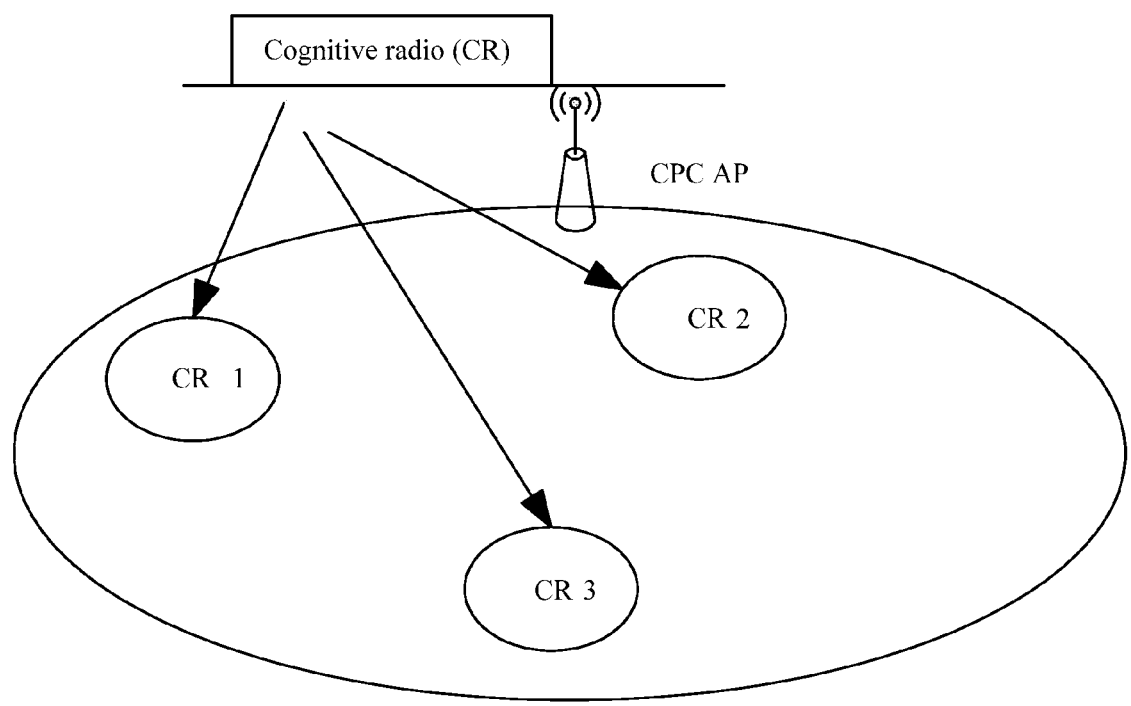
FIG. 5 is a schematic structural diagram of a network according to a fourth embodiment of the present invention.

As shown in FIG. 5, as the CPC AP supports large-area coverage which may reach hundreds of miles, various types of cells may be included under the CPC AP. A cognitive network exists in a small area and may be within only tens of meters, for example, a home and a conference venue. The base station supports terminal access of only a home or a conference room. The terminal and the base station negotiate a work frequency by cognizing a surrounding environment. As the cognitive network covers only a small area whereas a CPC network is a network with large-area coverage, the private resources allocated to the cognitive system may be reused when cognitive networks do not interfere with each other. In FIG. 5, the private resources of the cognitive system are allocated by the CPC AP to three cognitive radio (Cognitive Radio, CR) networks covered by the CPC network.

405: After obtaining a private channel allocated by the CPC AP, the base station releases a link, disconnects the bearer with the CPC AP, where the bearer is established in step 402, and performs broadcasting on the private channel, where broadcast content includes cognitive information of the base station and description information of an uplink access channel.

406: After receiving broadcast information over the private channel, the terminal may judge, according to signal strength, whether the base station meets a service requirement, select a base station that meets the service requirement of the terminal according to the cognitive information of the terminal and that of the base station (an intersection between the cognitive information of the terminal and that of the base station cannot be null; if the intersection is null, it is indicated that no same available channel is cognized), read the description information of the uplink access channel, and send a random access request to the base station according to a location of random access resources.

407: After receiving random access requests of multiple users, the base station judges whether private channel resources need to be adjusted according to the number of cognitive users. The specific judging manner may be judging whether the amount of CPC private resources is greater than or equal to the amount of resources that are requested by the multiple users. If the private channel resources do not need to be adjusted, go to step 408; if the private channel resources need to be adjusted, send a resource request for adjusting the amount of private channel resources to the CPC AP, and send the terminal the obtained resource information that includes resources that are allocated for the terminal to report a cognition result.

408: After the terminal sends an access request to the base station, the base station allocates, on the CPC private channel, resources for the terminal to report the cognition result, that is, an uplink access channel, where information about the uplink access channel may be carried in the description information of the uplink access channel. Then, the terminal sends cognitive information to the base station over the resources.

It should be noted that the channel resources specified in the information about the uplink access channel belong to a channel specified in the CPC private resources. The channel specified in the CPC private resources is used both for the based station to send the cognitive information and the description information of the uplink access channel and for the terminal to receive the foregoing information; whereas the terminal sends information to the base station by using the channel resources allocated by the base station for the terminal, that is, the channel specified in the description information of the uplink access channel.

409: After receiving the cognitive information of the terminal, the base station integrates the cognition result, decides a work frequency, and broadcasts a decision result.

410: After obtaining the broadcast information about the work frequency, the terminal judges whether the work frequency is the most proper one, if no, continues to send a message that includes a work frequency expected by the terminal to the base station, and after an agreement is reached with the base station, switches over to the agreed work frequency to establish a link with the base station, thereby completing networking of the cognitive network.

411: Meanwhile, the base station sends the CPC AP a request for releasing the CPC private resources.

In this embodiment, private CPC resources are allocated for the base station and the terminal. The terminal directly communicates with the base station, that is, does not communicate with the base station through the CPC AP any longer, which saves channel resources between the base station and the CPC AP; in addition, that the base station broadcasts an ID to the terminal is avoided and thereby the use of an ID with a large value is avoided, which reduces system implementation complexity; as the CPC AP allocates CPC private resources for an area where the base station is located, the base station does not need to perform positioning and the terminal does not need to judge a geographic location of the base station. Therefore, a positioning technology does not need to be introduced, which reduces system implementation complexity and costs. As the terminal does not need to judge the geographic location of the base station, complexity of selecting a proper base station is reduced.

Figure 6:
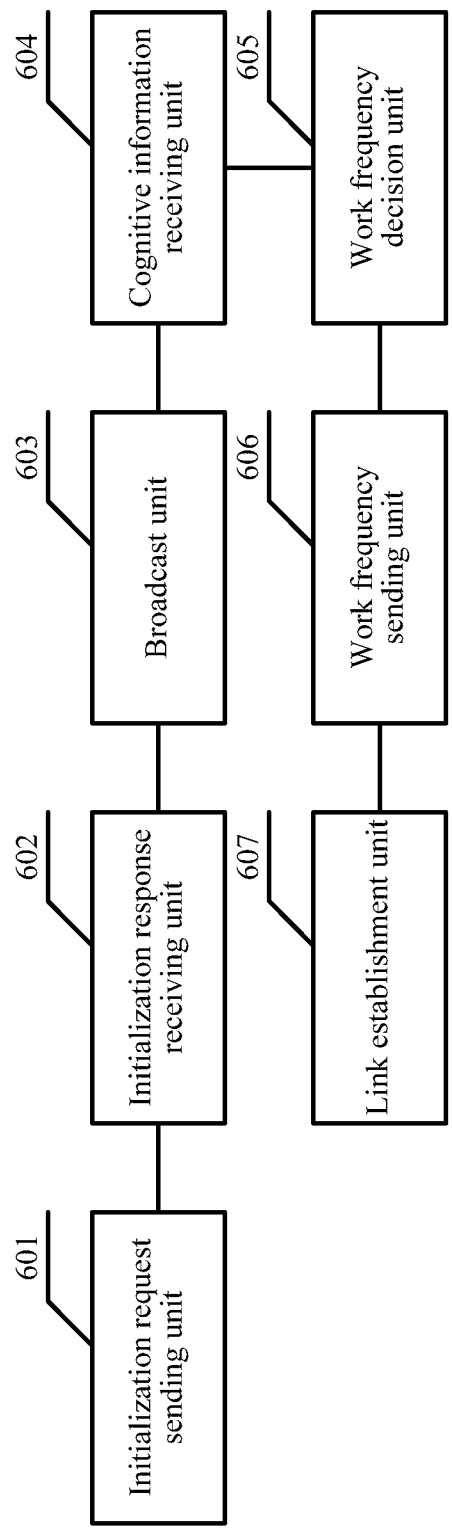
FIG. 6 is a schematic structural diagram of a base station according to a fifth embodiment of the present invention.

A fifth embodiment is shown in FIG. 6. This embodiment of the present invention provides a base station, including:

an initialization request sending unit 601, configured to send a frequency initialization request message to a CPC AP;

an initialization response receiving unit 602, configured to receive a frequency initialization response message sent by the CPC AP, where the frequency initialization response message includes CPC private resource description information;

a broadcast unit 603, configured to broadcast cognitive information of a base station and description information of an uplink access channel to a terminal over a channel specified in the CPC private resource description information;

a cognitive information receiving unit 604, configured to receive cognitive information of the terminal over CPC private resources, where the cognitive information of the terminal is sent, when an intersection between the cognitive information of the terminal and that of the base station is not null, by the terminal over a channel specified in the description information of the uplink access channel;

a work frequency decision unit 605, configured to decide a work frequency according to the cognitive information of the terminal;

a work frequency sending unit 606, configured to send the decided work frequency to the terminal; and a link establishment unit 607, configured to establish, on the decided work frequency, a link with the terminal.

Figure 7:
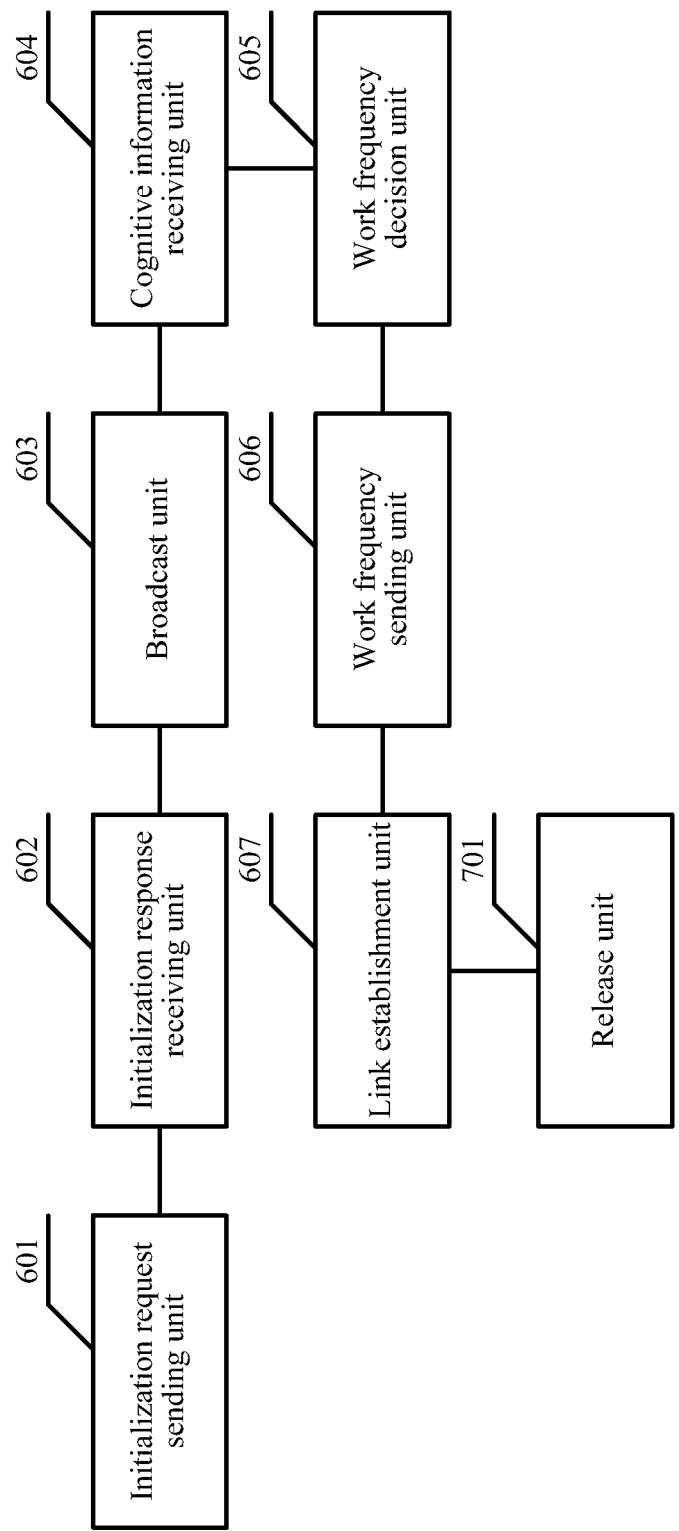
FIG. 7 is a schematic structural diagram of a base station according to a fifth embodiment of the present invention.

Further, as shown in FIG. 7, the base station includes:

a release unit 701, configured to release, after work frequency decision is completed, resources of the channel specified in the CPC private resource description information.

Figure 8:
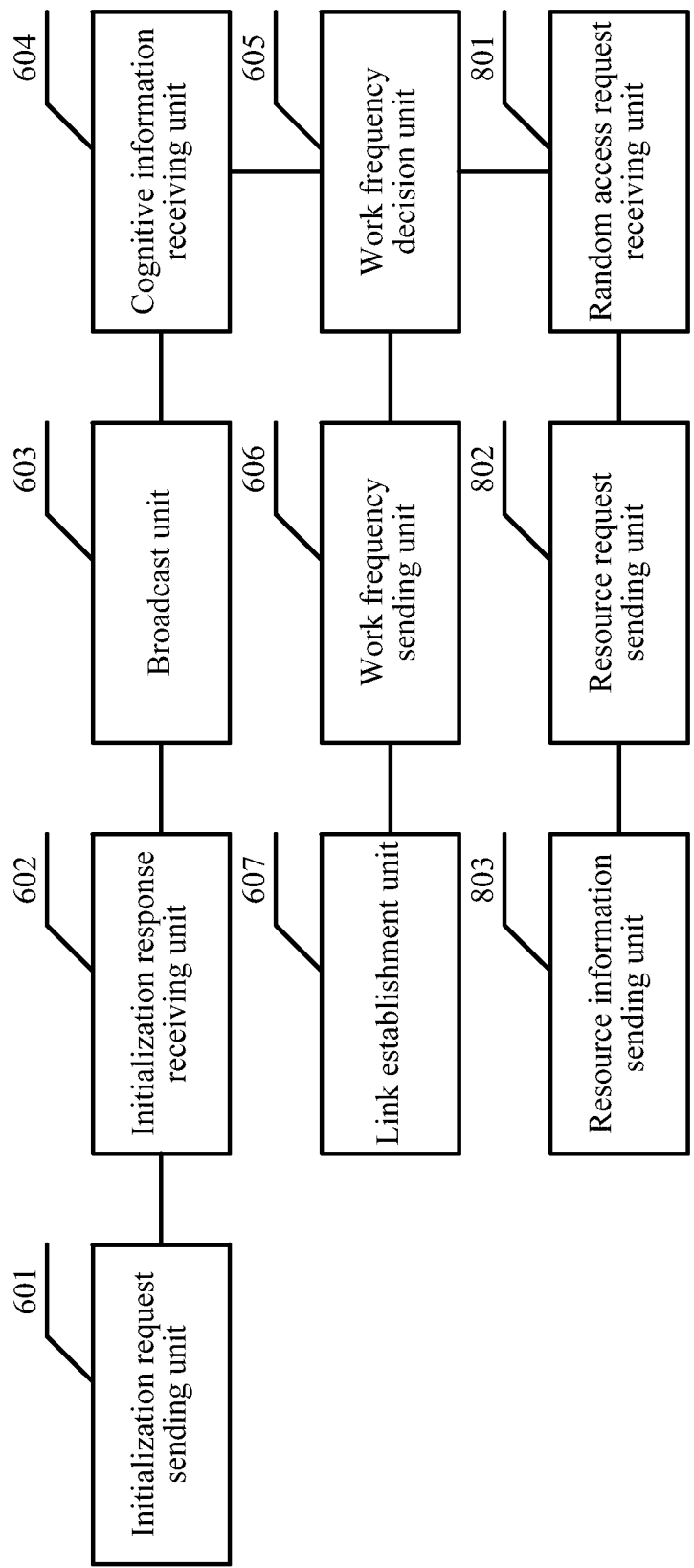
FIG. 8 is a schematic structural diagram of a base station according to a fifth embodiment of the present invention.

Further, as shown in FIG. 8, the base station includes:

a random access request receiving unit 801, configured to receive a random access request of the terminal; and a resource request sending unit 802, configured to send a resource request message to the CPC AP if the amount of resources requested in the random access request of the terminal exceeds the amount of CPC private resources specified in the CPC private resource description information; and a resource information sending unit 803, configured to send, to the terminal, received resource information that is returned by the CPC AP.

Figure 9:
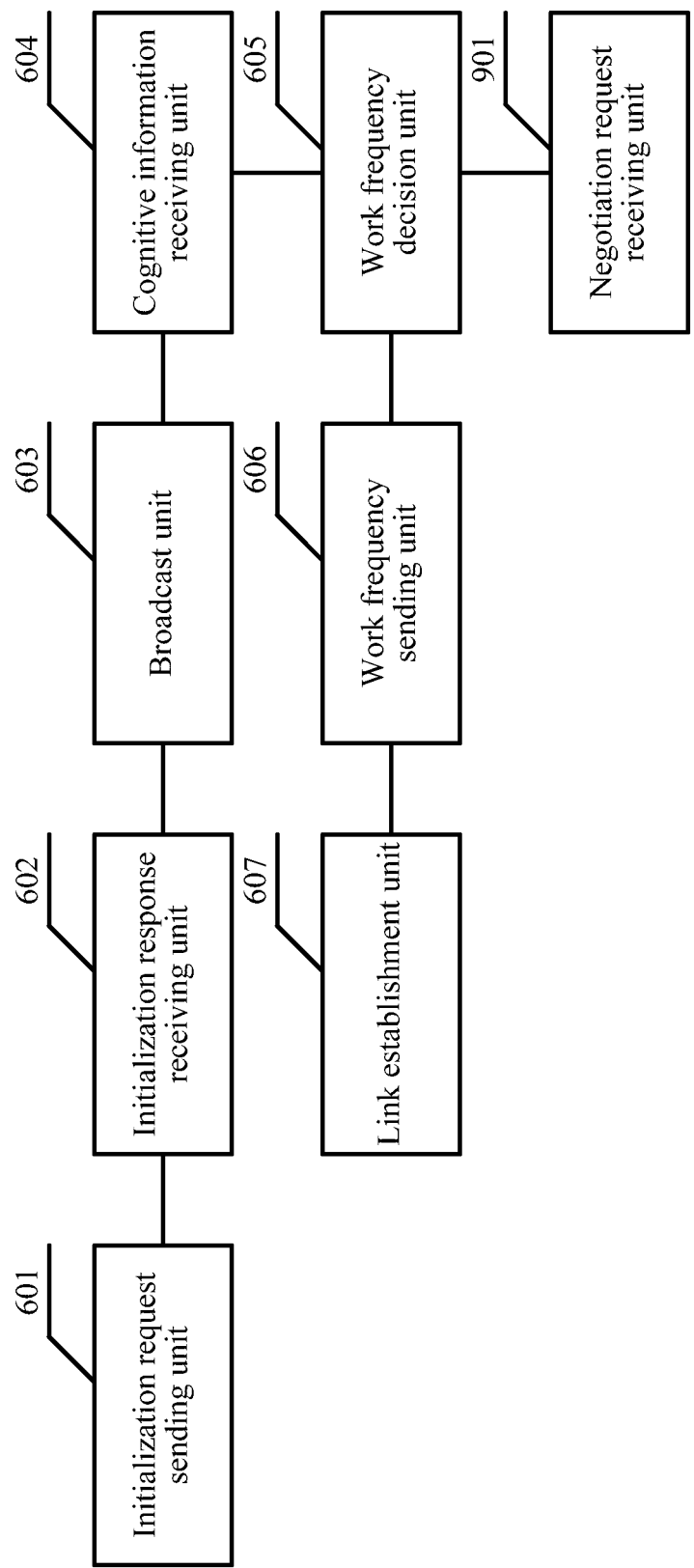
FIG. 9 is a schematic structural diagram of a base station according to a fifth embodiment of the present invention.

Further, as shown in FIG. 9, the base station includes:

a negotiation request receiving unit 901, configured to receive a negotiation request sent by the terminal, where the negotiation request carries a work frequency expected by the terminal; and the work frequency decision unit 605 is further configured to deciding a new work frequency according to the work frequency expected by the terminal;

the work frequency sending unit 606 is further configured to send the new work frequency to the terminal; and the link establishment unit 607 is further configured to establish, on the new work frequency, a link with the terminal.

In this embodiment, the base station does not need to broadcast its ID, which avoids the use of an ID with a large value. In addition, the base station does not need to perform positioning, which avoids an issue of a popularization difficulty caused by introduction of a positioning technology. Furthermore, the terminal does not need to judge a geographic location of the base station, which reduces complexity of selecting a proper base station.

Figure 10:
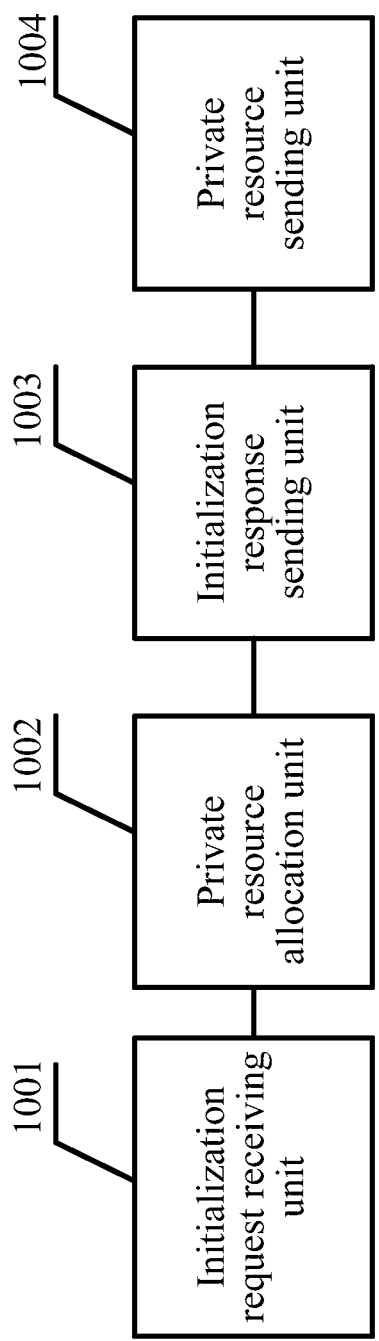
FIG. 10 is a schematic structural diagram of a CPC AP according to a fifth embodiment of the present invention.

A sixth embodiment is shown in FIG. 10. This embodiment of the present invention provides a CPC AP, including:

an initialization request receiving unit 1001, configured to receive a frequency initialization request message sent by a base station;

a private resource allocation unit 1002, configured to allocate CPC private resources for the base station after receiving the frequency initialization request message sent by the base station;

an initialization response sending unit 1003, configured to send a frequency initialization response message to the base station, where the frequency initialization response message includes CPC private resource description information; and a broadcast unit 1004, configured to broadcast the frequency initialization response message to a terminal.

Figure 11:
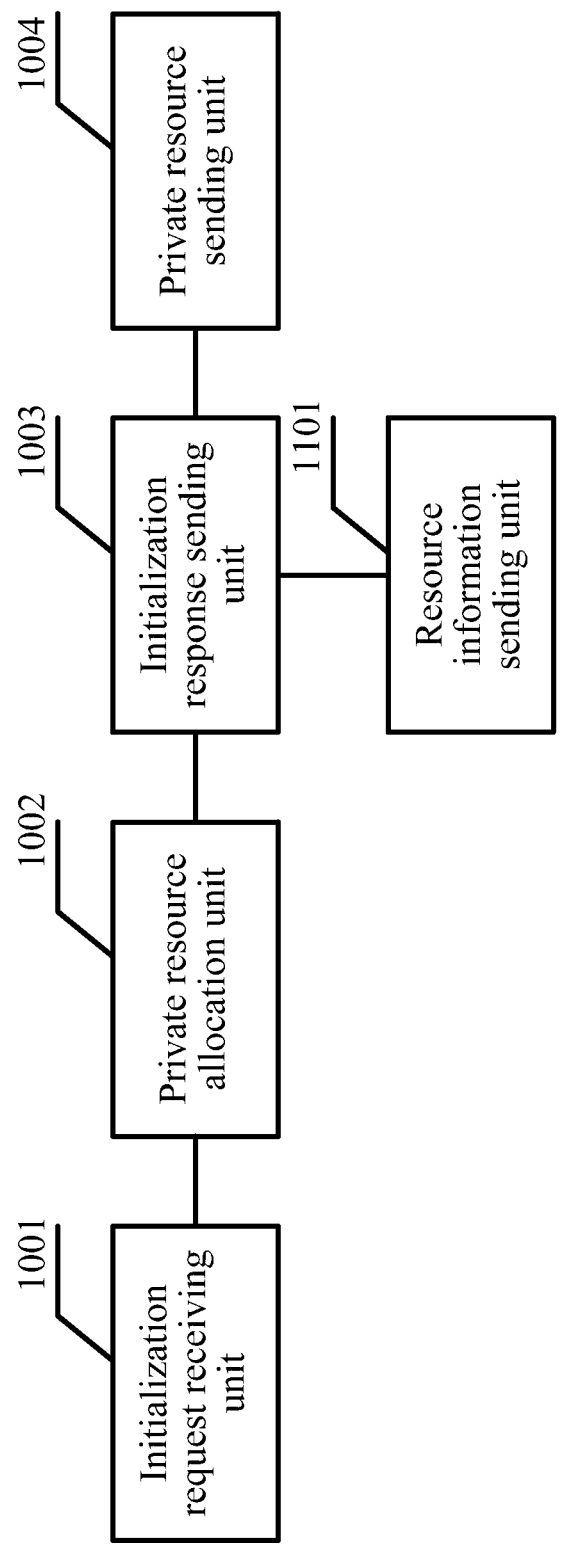
FIG. 11 is a schematic structural diagram of a CPC AP according to a fifth embodiment of the present invention.

Further, as shown in FIG. 11, the private dedicated resource allocation unit 1002 is further configured to, if a resource request message sent by the base station is received, re-allocate CPC resources according to the resource request message; and the CPC AP further includes a resource information sending unit 1101, configured to send information about allocated CPC resources to the base station and the terminal.

In this embodiment, private CPC resources are allocated for the base station and the terminal. The terminal directly communicates with the based station, that is, does not communicate with the base station any longer, which saves channel resources between the base station and the CPC AP; in addition, the base station does not need to broadcast its ID, which avoids the use of an ID with a large value; furthermore, the base station does not need to perform positioning, which avoids an issue of a popularization difficulty caused by introduction of a positioning technology; and at last, the terminal and the base station do not need to send a large number of messages over a CPC AP trunk, which saves CPC channel resources.

Figure 12:
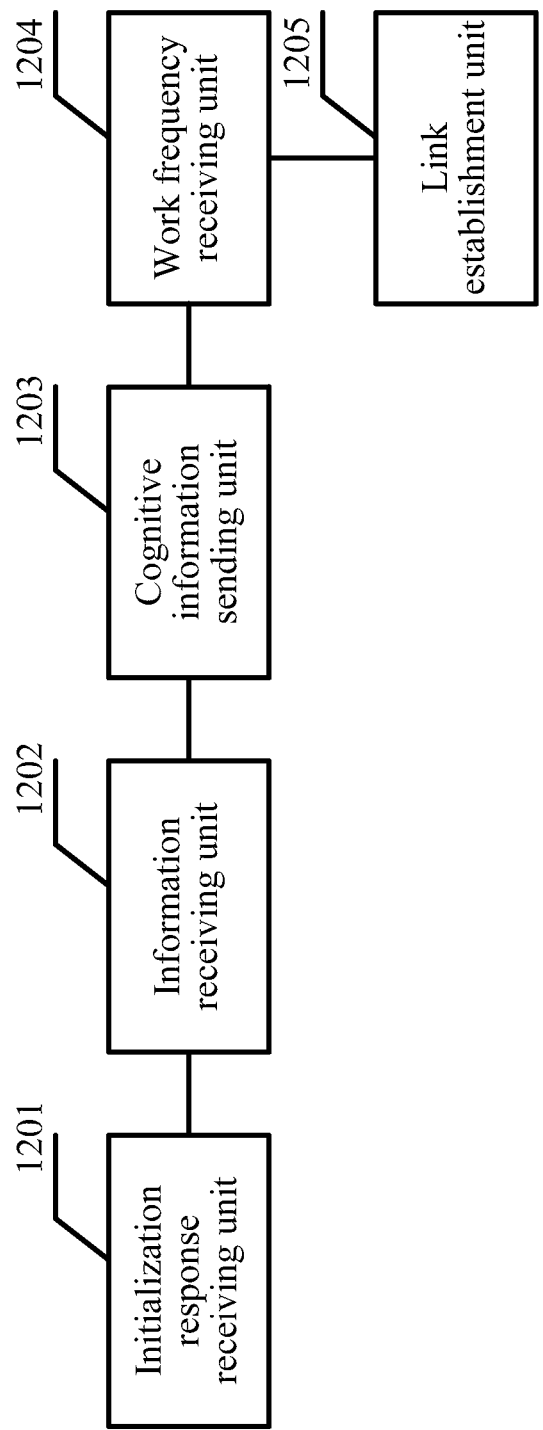
FIG. 12 is a schematic structural diagram of a terminal according to a seventh embodiment of the present invention.

A seventh embodiment is shown in FIG. 12. This embodiment of the present invention further provides a terminal, including:
- an initialization response receiving unit 1201, configured to receive a frequency initialization response message broadcast by a CPC AP, where the frequency initialization response message includes CPC private resource description information;
- an information receiving unit 1202, configured to receive cognitive information of a base station and description information of an uplink access channel over a channel specified in the CPC private resource description information;
- a cognitive information sending unit 1203, configured to send, when an intersection between the cognitive information of the terminal and that of the base station is not null, cognitive information of the terminal to the base station over a channel specified in the description information of the uplink access channel, where the cognitive information of the terminal is used to enable the base station to decide a work frequency;
- a work frequency receiving unit 1204, configured to receive a work frequency sent by the base station; and
- a link establishment unit 1205, configured to establish, on the work frequency, a link with the base station.

Figure 13:
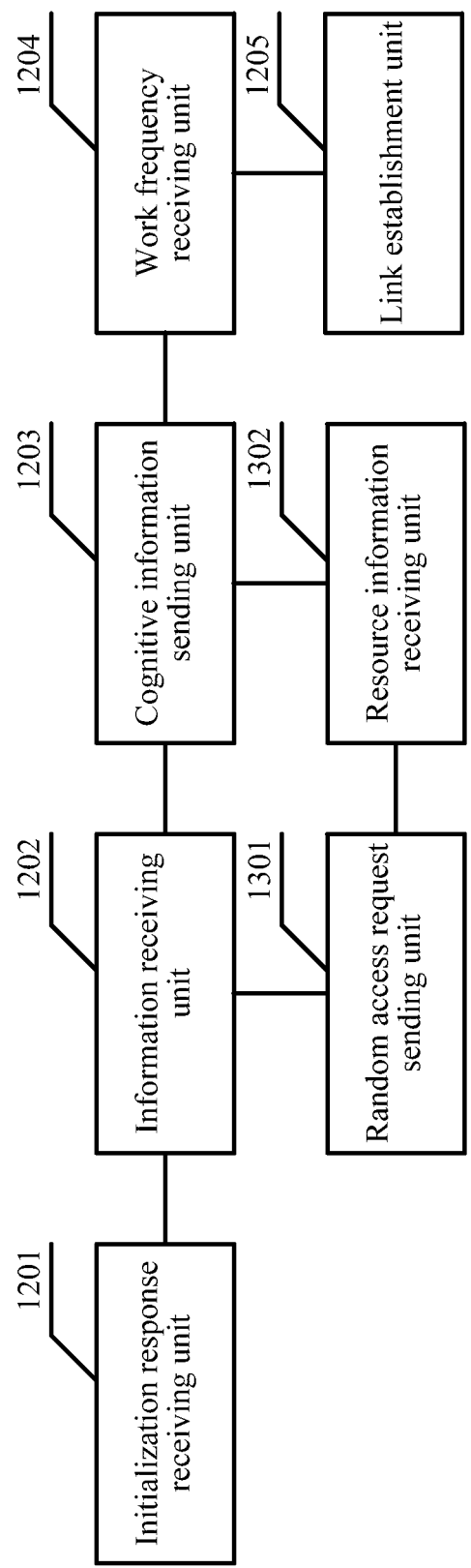
FIG. 13 is a schematic structural diagram of a terminal according to a seventh embodiment of the present invention.

Further, as shown in FIG. 13, the terminal further includes:
- a random access request sending unit 1301, configured to send a random access request message to the base station; and
- a resource information receiving unit 1302, configured to receive resource information; where
- the cognitive information sending unit 1203 is configured to send, over a channel specified in the resource information, the cognitive information of the terminal to the base station according to the description information of the uplink access channel.

Figure 14:
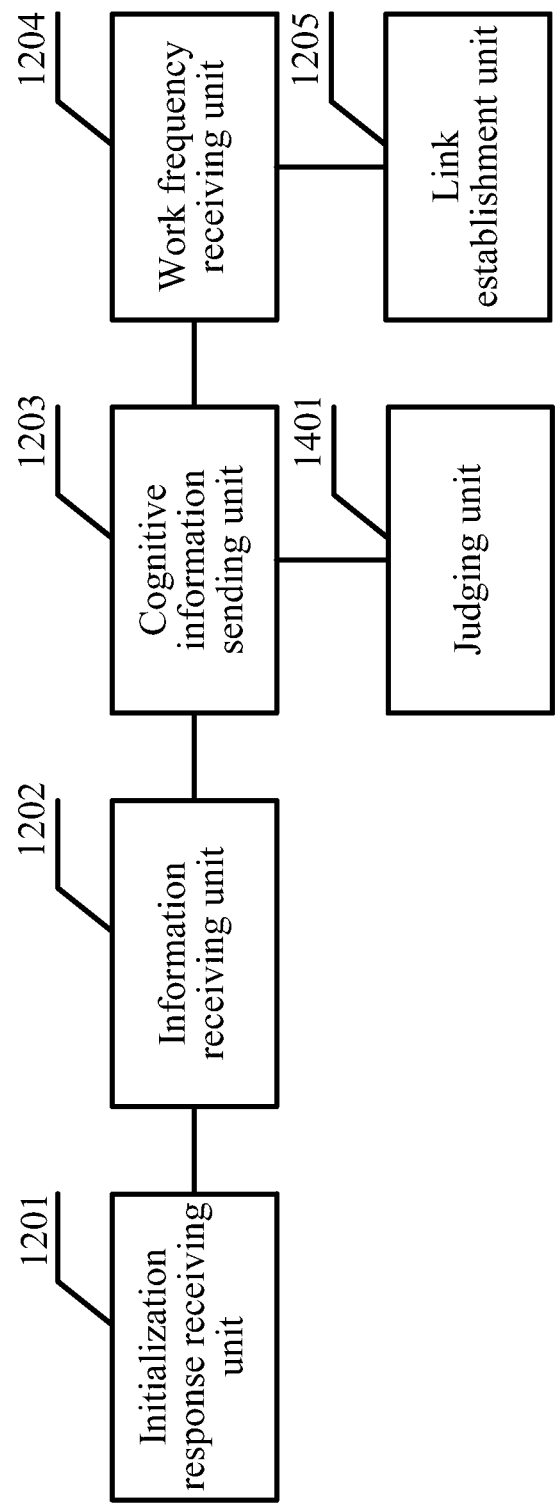
FIG. 14 is a schematic structural diagram of a terminal according to a seventh embodiment of the present invention.

Further, as shown in FIG. 14, the terminal further includes:
- a judging unit 1401, configured to judge, according to signal strength of the base station, whether the base station meets a service requirement of the terminal; where
- the cognitive information sending unit 1203 is configured to send the cognitive information of the terminal when the judging unit 1401 judges that the base station meets the service requirement of the terminal.

Figure 15:
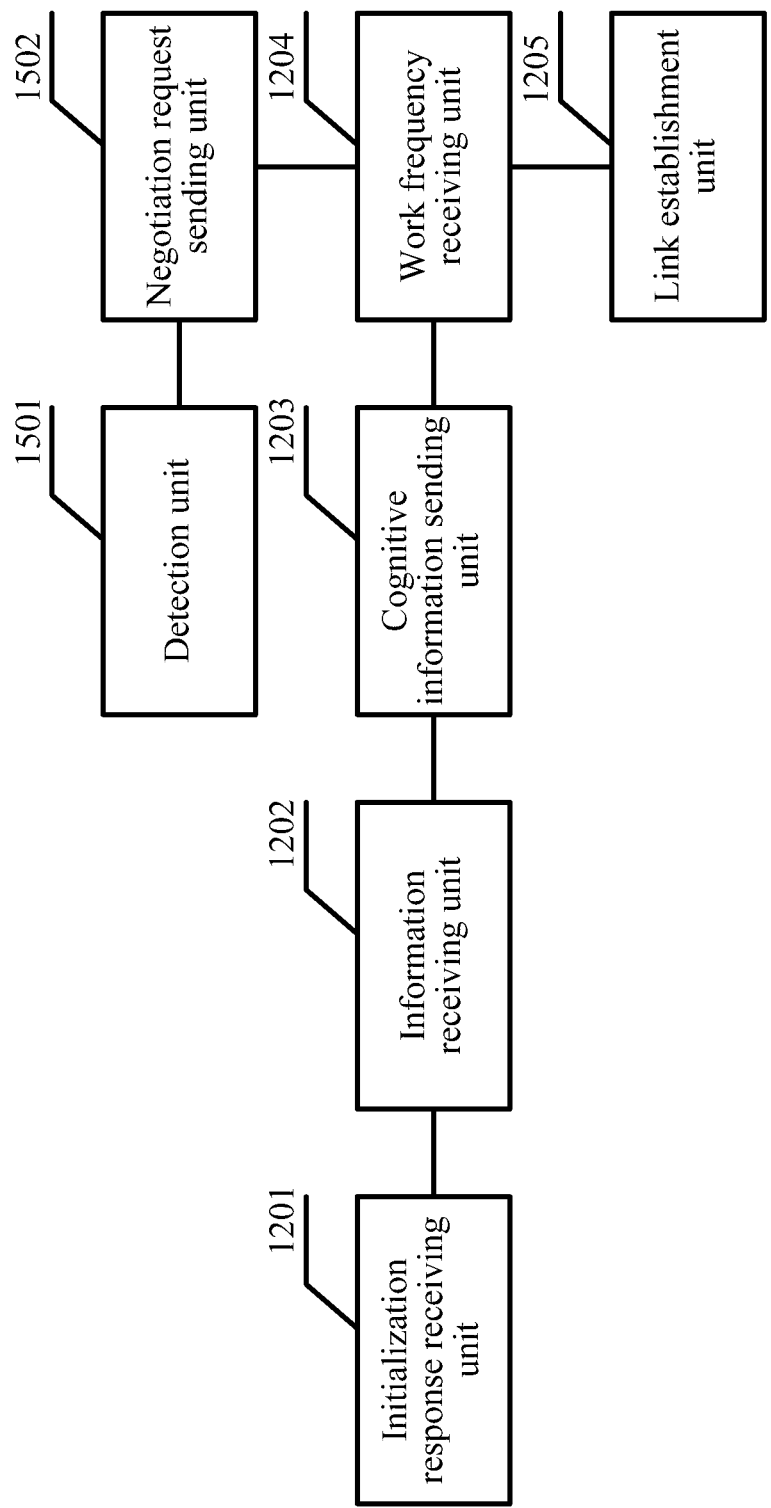
FIG. 15 is a schematic structural diagram of a terminal according to a seventh embodiment of the present invention.

Further, as shown in FIG. 15, the terminal further includes:
- a detection unit 1501, configured to detect whether the work frequency meets the service requirement of the terminal;
- a negotiation request sending unit 1502, configured to send a negotiation request to a base station if a detection result of the detection unit 1501 is that the work frequency does not meet the service requirement of the terminal, where the negotiation request carries a work frequency expected by the terminal; where
- the work frequency receiving unit 1204 is further configured to receive a new work frequency sent by the base station; and
- the link establishment unit 1205 is configured to establish, on the new work frequency, a link with the base station.

Figure 16:
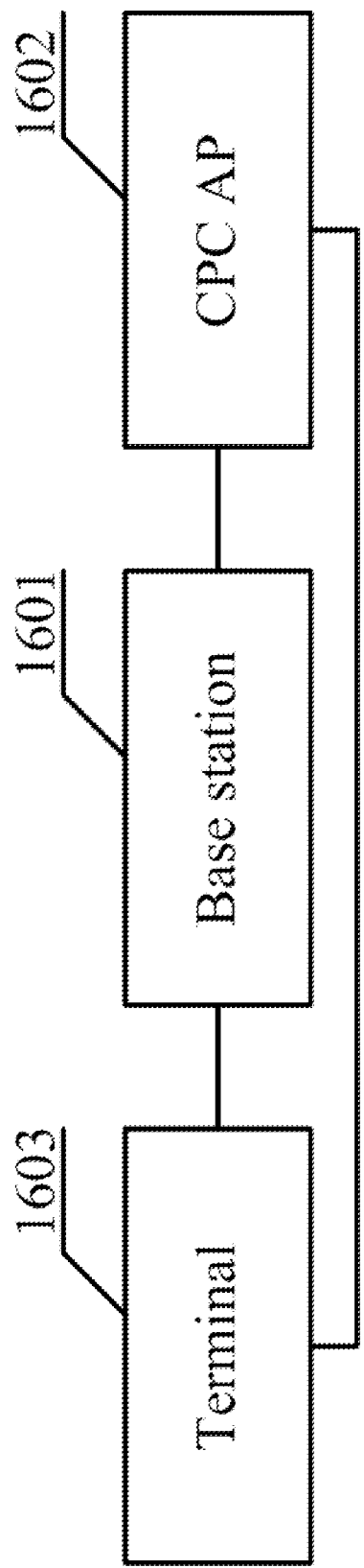
FIG. 16 is a schematic structural diagram of a system according to an eighth embodiment of the present invention.

An eighth embodiment is shown in FIG. 16. This embodiment of the present invention provides a cognitive system supported by a cognitive pilot channel, including:
- a base station 1601, configured to send a frequency initialization request message to a CPC AP (1602); receive a frequency initialization response message sent by the CPC AP, where the frequency initialization response message includes CPC private resource description information; broadcast cognitive information of the base station 1601 and description information of an uplink access channel to a terminal 1603 over a channel specified in the CPC private resource description information; receive cognitive information of the terminal 1603, decide a work frequency according to the cognitive information of terminal 1603, and send the decided work frequency to the terminal 1603; and establish, on the decided work frequency, a link with the terminal 1603; and
- the terminal 1603, configured to receive the frequency initialization response message broadcast by the CPC AP (1602), where the frequency initialization response message includes the CPC private resource description information; receive the cognitive information of the base station 1601 and the description information of the uplink access channel over the channel specified in the CPC private resource description information; send the cognitive information of the terminal 1603 to the base station 1601 over a channel specified in the description information of the uplink access channel, where an intersection between the cognitive information of the terminal 1603 and that of the base station 1601 is not null; receive the work frequency sent by the base station 1601 and establish, on the work frequency, a link with the base station 1601.

Further, the base station 1601 is further configured to receive a random access request of the terminal 1603 before receiving the cognitive information of the terminal 1603, and if the amount of resources requested in the random access request of the terminal 1603 exceeds the amount of CPC private resources specified in the CPC private resource description information, send a resource request message to the CPC AP (1602) and send, to the terminal 1603, received resource information that is returned by the CPC AP (1602).

The terminal 1603 is further configured to send the random access request message to the base station 1601 and receive resource information before sending the cognitive information of the terminal 1603, where the sending the cognitive information of terminal 1603 to the base station 1601 over the channel specified in the description information of the uplink access channel includes: sending the cognitive information of the terminal 1603 to the base station 1601 over a channel specified in the resource information.

Further,
- the base station 1601 is further configured to receive, before establishing, on the decided work frequency, the link with the terminal 1603, a negotiation request sent by the terminal 1603, where the negotiation request carries a work frequency expected by the terminal 1603; decide a new work frequency according to the work frequency expected by the terminal 1603 and send the new work frequency to the terminal 1603; and in this case, the establishing, on the decided work frequency, the link with the terminal 1603 includes: establishing, on the new work frequency, a link with the terminal 1603; and
- the terminal 1603 is further configured to detect whether the work frequency meets a service requirement of the terminal 1603 before establishing, on the work frequency, the link with the base station 1601, and if the work frequency does not meet the service requirement of the terminal 1603, send the negotiation request to the base station 1601, where the negotiation request carries the work frequency expected by terminal 1603; and receive the new work frequency sent by the base station 1601; and in this case, the establishing, on the work frequency, the link with the base station 1601 includes: establishing, on the new work frequency, a link with the base station 1601.

In this embodiment, private CPC resources are allocated for the base station and the terminal. The terminal directly communicates with the base station, that is, does not communicate with the base station through the CPC AP any longer, which saves CPC channel resources; the private CPC resources may be reused in different geographic location, which avoids that the base station and the terminal frequently occupy CPC resources and thereby also saves CPC channel resources; in addition, the base station does not need to broadcast its ID, which avoids the use of an ID with a large value; furthermore, the base station does not need to perform positioning, which avoids an issue of a popularization difficulty caused by introduction of a positioning technology. The terminal does not need to judge a geographic location of the base station, which reduces complexity of selecting a proper base station.

Persons of ordinary skill in the art should understand that all or part of the steps of the methods in the embodiments may be implemented by a program instructing relevant hardware. The program may be stored in a computer readable storage medium. The storage medium may be a read-only memory, a magnetic disk, a CD-ROM, and so on.

The method, the apparatus, and the cognitive system for initializing a cognitive system supported by a cognitive pilot channel that are provided in the embodiments of the present invention are described in detail in the preceding. In this document, specific examples are used to illustrate principles and implementation manners of the present invention. The preceding description of the embodiments is used only to help understand the methods and core idea of the present invention; meanwhile, those skilled in the art may make variations to the specific implementation manners and application scopes according to the idea of the present invention. In conclusion, the content of this specification shall not be construed as a limitation to the present invention.

The invention claimed is:

1. A method for initializing a cognitive system supported by a cognitive pilot channel, comprising:
    sending a frequency initialization request message to a cognitive pilot channel access point (CPC AP);
    receiving a frequency initialization response message sent by the CPC AP, wherein the frequency initialization response message comprises cognitive pilot channel (CPC) private resource description information;
    broadcasting cognitive information of a base station and description information of an uplink access channel to a terminal over a channel specified in the CPC private resource description information;
    receiving cognitive information of the terminal over CPC private resources, deciding a work frequency according to the cognitive information of the terminal, and sending the decided work frequency to the terminal, wherein the cognitive information of the terminal is sent, when an intersection between the cognitive information of the terminal and that of the base station is not null, by the terminal over a channel specified in the description information of the uplink access channel; and
    establishing, on the decided work frequency, a link with the terminal.

2. The method according to claim 1, comprising:
    after work frequency decision is completed, releasing resources of the channel specified in the CPC private resource description information.

3. The method according to claim 1 wherein before the receiving the cognitive information of the terminal, the method further comprises:
    receiving a random access request of the terminal, if the amount of resources requested in the random access request of the terminal exceeds the amount of CPC private resources specified in the CPC private resource description information, sending a resource request message to the CPC AP and sending, to the terminal, received resource information that is returned by the CPC AP.

4. The method according to claim 1, wherein before establishing, on the decided work frequency, the link with the terminal, the method further comprises:
    receiving a negotiation request sent by the terminal, wherein the negotiation request carries a work frequency expected by the terminal;
    deciding a new work frequency according to the work frequency expected by the terminal and sending the new work frequency to the terminal; and
    the establishing, on the decided work frequency, the link with the terminal comprises establishing, on the new work frequency, a link with the terminal.

5. A method for initializing a cognitive system supported by a cognitive pilot channel, comprising:
    receiving a frequency initialization response message broadcast by a cognitive pilot channel access point (CPC AP), wherein the frequency initialization response message comprises cognitive pilot channel (CPC) private resource description information;
    receiving cognitive information of a base station and description information of an uplink access channel over a channel specified in the CPC private resource description information;
    when an intersection between cognitive information of a terminal and that of the base station is not null, sending the cognitive information of the terminal to the base station over a channel specified in the description information of the uplink access channel, wherein the cognitive information of the terminal is used to enable the base station to decide a work frequency; and
    receiving a work frequency sent by the base station and establishing, on the work frequency, a link with the base station.

6. The method according to claim 5, wherein before the sending the cognitive information of the terminal, the method further comprises sending a random access request message to the base station and receiving resource information; and
    the sending the cognitive information of the terminal to the base station over the channel specified in the description information of the uplink access channel comprises sending the cognitive information of the terminal to the base station over a channel specified in the resource information.

7. The method according to claim 5, wherein before the sending the cognitive information of the terminal, the method further comprises:
    judging, according to signal strength of the base station, whether the base station meets a service requirement of the terminal, and if the base station meets the service requirement of the terminal, sending the cognitive information of the terminal.

8. The method according to claim 5, wherein before establishing, on the work frequency, the link with the base station, the method further comprises:

detecting whether the work frequency meets a service requirement of the terminal, and if the work frequency does not meet the service requirement of the terminal, sending a negotiation request to the base station, wherein the negotiation request carries a work frequency expected by the terminal;

receiving a new work frequency sent by the base station; and the establishing, on the work frequency, the link with the base station comprises establishing, on the new work frequency, a link with the base station.

9. A base station, comprising:

an initialization request sending unit, configured to send a frequency initialization request message to a cognitive pilot channel access point (CPC AP);

an initialization response receiving unit, configured to receive a frequency initialization response message sent by the CPC AP, wherein the frequency initialization response message comprises cognitive pilot channel (CPC) private resource description information;

a broadcast unit, configured to broadcast cognitive information of the base station and description information of an uplink access channel to a terminal over a channel specified in the CPC private resource description information;

a cognitive information receiving unit, configured to receive cognitive information of the terminal over CPC private resources, wherein the cognitive information of the terminal is sent, when an intersection between the cognitive information of the terminal and that of the base station is not null, by the terminal over a channel specified in the description information of the uplink access channel;

a work frequency decision unit, configured to decide a work frequency according to the cognitive information of the terminal;

a work frequency sending unit, configured to send the decided work frequency to the terminal; and a link establishment unit, configured to establish, on the decided work frequency, a link with the terminal.

10. The base station according to claim 9, further comprising:

a release unit, configured to release, after work frequency decision is completed, resources of the channel specified in the CPC private resource description information.

11. The base station according to claim 9, further comprising:

a random access request receiving unit, configured to receive a random access request of a terminal;

a resource request sending unit, configured to send a resource request message to the CPC AP if the amount of resources requested in the random access request of the terminal exceeds the amount of CPC private resources specified in the CPC private resource description information; and a resource information sending unit, configured to send, to the terminal, received resource information that is returned by the CPC AP.

12. The base station according to claim 9, comprising:

a negotiation request receiving unit, configured to receive a negotiation request sent by the terminal, wherein the negotiation request carries a work frequency expected by the terminal;

wherein the work frequency decision unit is further configured to decide a new work frequency according to the work frequency expected by the terminal;

the work frequency sending unit is further configured to send the new work frequency to the terminal; and the link establishment unit is configured to establish, on the new work frequency, a link with the terminal.

13. A terminal, comprising:

an initialization response receiving unit, configured to receive a frequency initialization response message broadcast by a cognitive pilot channel access point (CPC AP), wherein the frequency initialization response message comprises cognitive pilot channel (CPC) private resource description information;

an information receiving unit, configured to receive cognitive information of a base station and description information of an uplink access channel over a channel specified in the CPC private resource description information;

a cognitive information sending unit, configured to send, when an intersection between cognitive information of the terminal and that of the base station is not null, the cognitive information of the terminal to the base station over a channel specified in the description information of the uplink access channel, wherein the cognitive information of the terminal is used to enable the base station to decide a work frequency;

a work frequency receiving unit, configured to receive a work frequency sent by the base station; and a link establishment unit, configured to establish, on the work frequency, a link with the base station.

14. The terminal according to claim 13, further comprising:

a random access request sending unit, configured to send a random access request message to the base station;

a resource information receiving unit, configured to receive resource information; and wherein the cognitive information sending unit is configured to send the cognitive information of the terminal to the base station according to the description information of the uplink access channel over a channel specified in the resource information.

15. The terminal according to claim 13, further comprising:

a judging unit, configured to judge, according to signal strength of the base station, whether the base station meets a service requirement of the terminal; and wherein the cognitive information sending unit is configured to send the cognitive information of the terminal when the judging unit judges that the base station meets the service requirement of the terminal.

16. The terminal according to claim 13, further comprising:

a detection unit, configured to detect whether the work frequency meets the service requirement of the terminal;

a negotiation request sending unit, configured to send a negotiation request to the base station if a detection result of the detection unit is that the work frequency does not meet the service requirement of the terminal, wherein the negotiation request carries a work frequency expected by the terminal;

wherein the work frequency receiving unit is further configured to receive a new work frequency sent by the base station; and the link establishment unit is configured to establish, on the new work frequency, a link with the base station.

* * * * *